United States Patent [19]

Bulychev et al.

[11] 4,116,056

[45] Sep. 26, 1978

[54] DEVICE FOR SUSPENSION OF AIRCRAFT MODEL IN WIND TUNNEL

[76] Inventors: Gennady Alexeevich Bulychev, ulitsa Dugina, 27, kv. 73; Anatoly Vladimirovich Bykovsky, ulitsa Gagarina, 26, kv. 70; Stanislav Pavlovich Machigin, ulitsa Naberezhnaya Tsiolkovskogo, 20, kv. 53; Konstantin Sergeevich Strelkov, ulitsa Pushkina, 12, kv. 1, all of Zhukovsky Moskovskoi oblasti, U.S.S.R.

[21] Appl. No.: 814,973

[22] Filed: Jul. 12, 1977

[51] Int. Cl.$^2$ ............................................. G01M 9/00
[52] U.S. Cl. .................................................. 73/147
[58] Field of Search ............................. 73/147, 117.4

[56] References Cited

U.S. PATENT DOCUMENTS

| | | | |
|---|---|---|---|
| 1,682,138 | 8/1928 | Merrill | 73/147 |
| 3,276,251 | 10/1966 | Reed | 73/147 |
| 3,695,101 | 10/1972 | Hanson | 73/147 |

Primary Examiner—Donald O. Woodiel
Attorney, Agent, or Firm—Burgess, Ryan and Wayne

[57] ABSTRACT

The proposed device comprises a system of vertical and horizontal ropes fastened to an aircraft model at points located ahead and behind the model's center of gravity and secured in a wind tunnel through elastic members, which provides six degrees of freedom for the model in the throat of the wind tunnel. The system also includes a tensioning means for the horizontal ropes. The use of hoisting mechanisms connected to the elastic members of the vertical ropes makes it possible to adjust the position of the model in the throat of the wind tunnel both prior to and during experiments and thus dispense with controls to be mounted on the model. The proposed device makes it possible to simulate flight conditions for a wide variety of models within the subsonic speed range and fully eliminates what is known as suspension flutter. The invention is intended for experimental investigation of the dynamic strength and flutter characteristics of aircraft.

12 Claims, 6 Drawing Figures

DEVICE FOR SUSPENSION OF AIRCRAFT MODEL IN WIND TUNNEL

The present invention relates to technical means for experimental study of aeroelasticity and stability conducted with dynamically similar models of aircraft in low-velocity wind tunnels under conditions very close to those of free flight and more particularly, the present invention relates to devices for suspension of aircraft models in a wind tunnel.

The invention can be used for studying the problems of dynamic strength and flutter characteristics of aircraft.

Studies of these problems on dynamically similar models are of crucial importance for the flying safety of aircraft.

Development of devices for such tests is a complex engineering problem. On the one hand, the suspension should not hinder the motion of the model, in order that the conditions of the tests in a wind tunnel should be similar to those of free flight; on the other hand, it must keep the model in the medium portion of the wind tunnel to prevent comparatively large displacements of the model and rejection of the model from the flow in free-jet wind tunnels.

The latter is particularly important when testing models having no special piloting systems, which simplifies the experiment and increases its effectiveness.

Fastening a model in the test section of a wind tunnel providing six degrees of freedom for the model during the tests can lead to instability of the suspended model as a rigid body (the so-called "suspension flutter") and can have a marked effect on the results of the tests recalculated by the scale factor of the mechanical similarity theory. Therefore, when developing a device for suspension of an aircraft model in the test section of a wind tunnel, careful laboratory investigation is carried out to develop means providing stability of the suspended model at any velocity of the flow in the wind tunnel and minimize the effect of the suspension on the test results. Owing to many complex phenomena involved, such problems are presently solved mainly in experimental conditions.

Known in the art is a device for suspension of an aircraft model in a wind tunnel (cf. U.S. Pat. No. 3,276,251, Cl.73-147), which is used for testing a dynamically similar model of an aircraft for flutter at subsonic velocities of the flow in the NASA wind tunnel (cf. "Proc. of Symposium on Aeroelastic and Dynamic Modeling Technology" 23–25, September 1963, Dayton, Ohio 1964).

The device consists of a front rope and a rear rope located in the vertical and horizontal planes of an aircraft model. The ropes are passed loop-like through the model rollers and are secured to the walls of the wind tunnel by means of springs providing definite tension of the ropes. The ropes are secured inside the fuselage ahead and behind the centre of gravity of the model.

The device for suspension of the model simulates the conditions of a free flight and provides six degrees of freedom of movement of the model as a rigid body, has a negligible mass compared to that of the model and provides for investigations both at subsonic and supersonic velocities of the flow.

A specific type of fastening the model is selected on the constructional basis: single or double pulleys in the model fuselage; a horizontally or vertically arranged front rope (in this case the rear rope is placed in a plane perpendicular to that of the front rope).

When the front rope is arranged in a vertical plane, its one end is rigidly fixed to the upper wall of the wind tunnel and passed over the pulley located in the front part of the fuselage (in front of the centre of gravity of the model), while the second end through a spring is fixed to the lower wall of the wind tunnel. In this case the rear rope is arranged in a horizontal plane and fixed on the lateral walls of the wind tunnel similarly to the fastening of the front rope. Thus, the model suspended has six degrees of freedom of motion: vertical motion and turn (pitching) with respect to the transverse axis of the model is effected by moving the model through a half-loop of the front rope sliding on the pulleys and during the "pendulum" motion of the model with respect to the axis passing through the points of mounting of the rear rope;

side motion and a turn with respect to the vertical axis (yaw) at the expense of "pendulum" motion of the model with respect to the axis passing through the points of mounting of the front rope and motion of the model on the pulley along the half-loop of the rear rope;

longitudinal motion of the model due to elastic mounting of the front and rear ropes; the turn with respect to the longitudinal axis (bank) is effected at insignificant motion of the model on the pulleys along the front and rear half-loops simultaneously.

The frequency characteristics and stability characteristics of the model are determined by tensioning the rear rope by means of a tension mechanism. The value of the tension is read by means of a transducer. It is clear that this value depends on the characteristics of the tested model; however, the tension must be sufficient for provision of the "flight" of the model and of the dynamic stability of the "model-suspension" system, but this tension must be sufficiently small to ensure that the natural frequencies of the "model-suspension" system are lower than the frequencies of the model as a rigid body in a free flight. The model to be tested with such a suspension is provided with a system for piloting in the wind tunnel flow.

However, the known suspension does not allow for testing comparatively heavy models at low (subsonic) velocities of the flow, because in this case excessive forces are required for tensioning the ropes, which can result in a significant change in the frequency spectrum of the "model-suspension" system. Furthermore, it is necessary to have a system for piloting the model during the tests.

It is an object of the present invention to provide a device for suspension of an aircraft model ensuring conduction of tests of wide-range dynamically similar models under conditions close to those of free flight and eliminating the elements of a system for piloting the model when conducting experiments in low-velocity wind tunnels.

This object is attained by providing a device for suspension of an aircraft model in a wind tunnel, comprising a system of ropes with tensioning means; the ends of these ropes are fastened on the wind tunnel body through elastic elements, while the other ends thereof are connected to the model so that the latter performs a "free flight" in the process of the tests; according to the invention, the system of ropes consists of at least one rope arranged in a vertical plane and secured to the model at a point located ahead of its centre of gravity and at least two ropes located in the vertical plane of symmetry of the model and connected to the model at points located, respectively, ahead and behind its centre of gravity.

The system of ropes may comprise two ropes arranged in a horizontal plane and extending along both sides of the fuselage of the model in parallel to its longitudinal axis. In this case the fastening of the ropes to the model in front of its centre of gravity is preferably effected by means of an equal-arm lever of the first kind passed through a slot provided in the model and resting on a hinge joint therein, while the fastening of the ropes behind its centre of gravity can be effected by means of guides cantilevered to the fuselage of the model.

It is expedient that the ropes be fastened to the wind tunnel at a single point in front of the model and at a single point behind the model, in which case at the point of fastening the ropes to the wind tunnel body, located in front of the model, there is mounted a pulley over which the respective two ends of the ropes are passed, said ends being connected to each other.

The system of vertical ropes may also comprise four ropes, two of which are located in a vertical plane of symmetry of the model, respectively, ahead and behind its centre of gravity, whereas two other additional ropes are arranged in the vertical plane behind the centre of gravity of the model, normal to the vertical plane of symmetry of the model.

Furthermore, the system of vertical ropes may comprise three ropes, one of which is connected to the model at a point in front of its centre of gravity, while the two other ropes are connected to the model in a vertical plane extending behind its centre of gravity normal to the vertical plane of symmetry of the model.

The ends of the ropes arranged in the vertical plane of symmetry of the model are preferably connected through elastic members to respective load-lifting mechanisms allowing one to control the position of the model in the wind tunnel both during the mounting of this model and in the process of testing the same.

All these features provide for tests for dynamically similar models of a wide range under conditions close to those of free flight.

Furthermore, such a design of the device for suspension of a model of an aircraft in a wind tunnel when conducting the experiment eliminates the necessity of mounting the elements of a system for piloting the model.

The invention is further described with reference to the accompanying drawings, in which.

Figure 1:
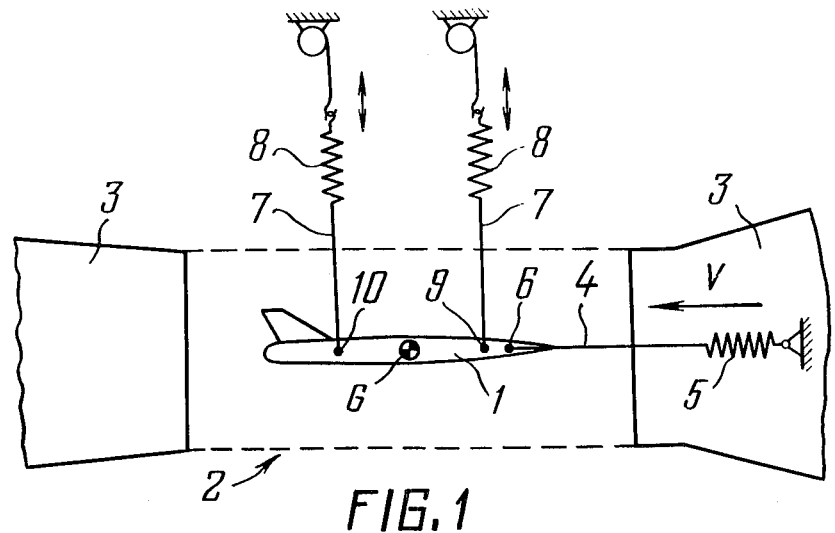
FIG. 1 is a schematic side view of a device for suspension of an aircraft model in a wind tunnel, according to the invention.

The proposed device for suspension of an aircraft model 1 (FIG. 1) in the test section 2 of a low-velocity wind tunnel 3 is made in the form of a system of ropes and comprises at least one rope 4 arranged in a horizontal plane, one end of this rope is fastened through an elastic member 5 to the housing of the wind tunnel 3 while the other end is fastened to the model 1 at a point 6 located ahead of the centre of gravity G of the model 1 and at least two ropes 7 arranged in the vertical plane of symmetry of the model. One ends of these ropes 7 through elastic elements 8 are fastened to the housing of the wind tunnel, while the other ends thereof are connected to the model 1 at points 9 and 10 located before and after the centre of gravity G at a definite distance. This distance is selected on the condition of provision of stability of the "model-suspension" system in the flow V of the wind tunnel. The direction of the flow velocity in the wind tunnel is shown by an arrow in all figures.

Figure 2:
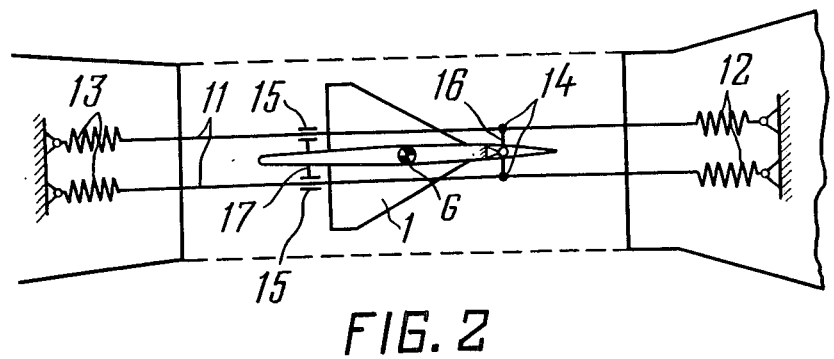
FIG. 2 is a schematic top view of a device for suspension of an aircraft model in a wind tunnel, according to the invention.

The system of ropes may include two ropes 11 (FIG. 2) arranged in a horizontal plane and passing on both sides of the fuselage of the model 1. These ropes 11 are fastened to the housing of the wind tunnel 3 before and after the model 1 through elastic elements 12 and 13 (FIG. 2), while to the model 1 they are fastened at two points 14 and 15 before and after the centre of gravity G of this model; at points 14 located in front of the centre of gravity G the ropes 11 are rigidly fastened to the model 1 by means of an equal-arm lever 16 of the first kind, while behind the centre of gravity G (points 15) of the model the ropes are freely passed through guides 17 cantilevered to the fuselage of the model 1.

Figure 3:
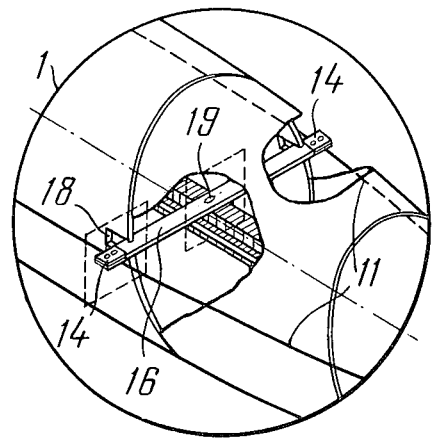
FIG. 3 shows the fastening of the ropes, arranged in the vertical plane, to the model ahead of its centre G of gravity, according to the invention.

FIG. 3 shows in detail the fastening of the ropes 11 to the model 1 through the first-kind equal-arm lever 16. The lever 16 extends through a transverse slot 18 provided in the model 1 and hinged in the fuselage of the model at a point 19.

Such fastening of the ropes 11 provides balancing of the drag forces of the model by the suspension device ahead of the centre of gravity G of the model and this increases its stability in the flow V of the wind tunnel. The disposition of the points 14 and 15 of fastening the ropes 11 to the model 1 with respect to its centre of gravity G is also selected so as to provide the stability of the "model-suspension" system in the flow V of the wind tunnel taking into account the simulation of the free flight of the model.

Figure 4:
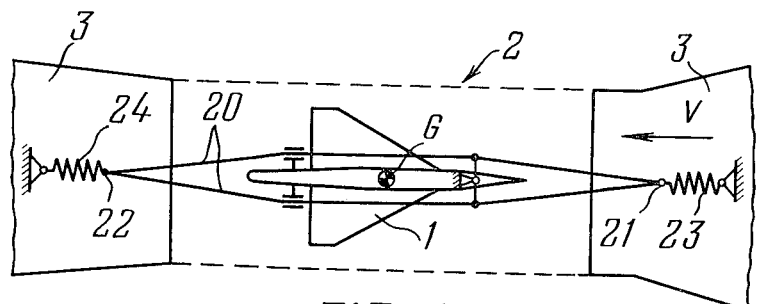
FIG. 4 shows an arrangement of the horizontal ropes, according to the invention.

The ropes 20 (FIG. 4) arranged in a horizontal plane can be fastened to the housing of the wind tunnel 3 at a single point 21 ahead of the model 1 and at a single point 22 behind the model 1 by means of elastic elements 23 and 24.

Figure 5:
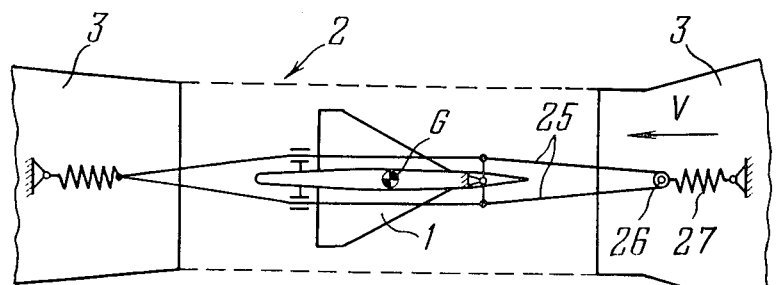
FIG. 5 shows an alternative arrangement of the horizontal ropes, according to the invention.

The ropes 25 (FIG. 5) arranged in a horizontal plane can be fastened to the housing of the wind tunnel 3 ahead of the model 1 by means of a pulley 26 through which there are passed the ends of the ropes 25 connected to each other. The pulley 26 (FIG. 5) is fastened to one end of the elastic element 27 whose other end is secured to the housing of the wind tunnel 3.

Figure 6:
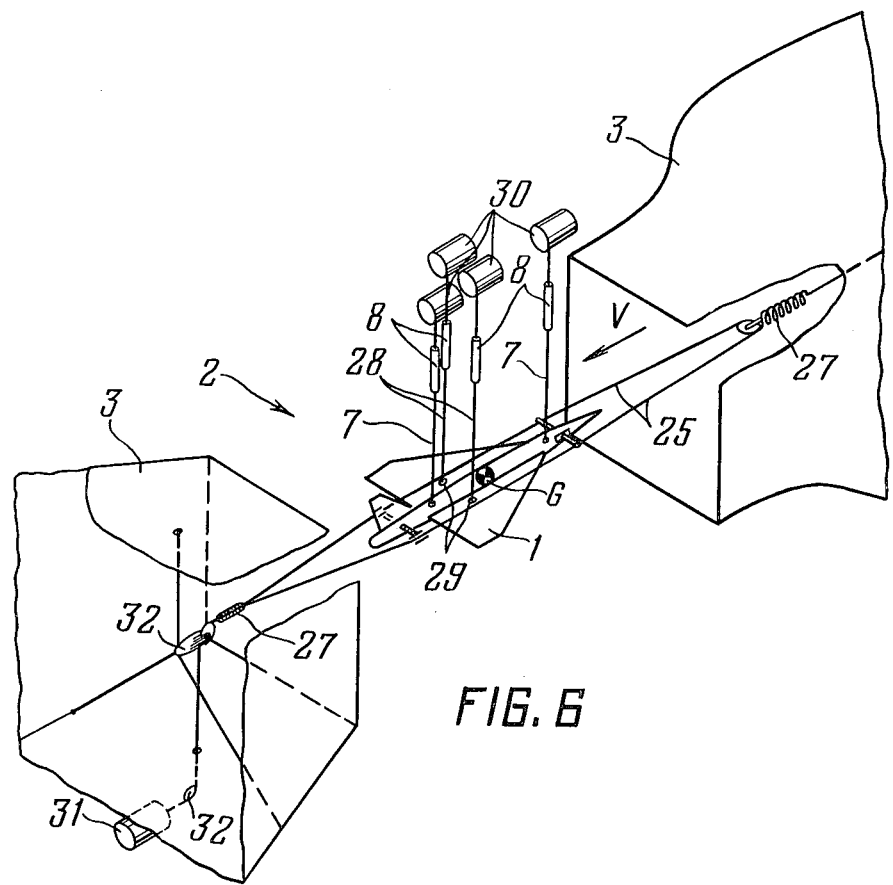
FIG. 6 is a schematic representation of an optimum embodiment of the proposed device for suspension of an aircraft model in a wind tunnel.

The vertical ropes supporting the model 1 within the working test section 2 of the wind tunnel 3 can be arranged in different ways (FIGS. 1 and 6). Thus, apart from the two ropes 7 arranged in a vertical plane of symmetry of the model, there can be mounted at least two additional ropes 28 (FIG. 6) located in a plane perpendicular to the plane of symmetry of the model. Besides, only these two ropes 28 can be mounted thus eliminating the rope 7 (FIG. 6) located behind the centre of gravity G of the model 1. The additional ropes 28 are fastened to the model at points 29 located at the same distance from the plane of symmetry of the model. The other ends of the ropes 7 and 28 through elastic elements 8 are fastened to the housing of the wind tunnel 3 or connected to respective load-lifting mechanisms 30. Such fastening of the upper ends of the ropes 7 and 28 allowing for their movement in a vertical direction makes it possible to adjust the position of the model 1 in the test section 2 of the wind tunnel 3 both when mounting the model and when testing it.

Thus, the optimum version of the proposed device (FIG. 6) for suspension of an aircraft model 1 within the test section 2 of a low velocity wind tunnel 3 consists of a system of ropes comprising two ropes 25 arranged in a horizontal plane, one rope 7 arranged in the vertical plane of symmetry of the model 1 ahead of its centre of gravity G and two ropes 28 arranged in a vertical plane perpendicular to the plane of symmetry of the model.

The ropes 25 arranged in the horizontal plane are fastened to the housing of the wind tunnel 3 by means of elastic elements 27. The tension force of these ropes is developed by a tension mechanism 31 whose drive is connected to the ropes 25 through a system of pulleys 32.

The device for suspension of a model holds the model in a definite position within the test section of a wind tunnel and provides the model, as a rigid body, with six degrees of motion. The freedom of movement in a vertical plane is determined, essentially, by the rigidity of the elastic elements 8 taking the weight of the model. The freedom of motion of the model in the lateral direction depends on the length of the ropes 7 and 28 and, to some extent, on the tension force of the ropes 25, while in the direction of flow it is determined only by the rigidity of the elastic members 27. Thus, the given suspension device provides freedom of movement of the model in any direction practically independently of the other directions.

The movable fastening of the upper ends of the vertical ropes 7 and 28 (FIG. 6) providing for a possibility of vertical displacements by means of their connection with the corresponding load-lifting mechanisms makes it possible to considerably simplify the mounting of the model within the test section of a wind tunnel and to control the model without using the control members of the model itself, which in many cases cannot be made due to constructional difficulties.

The information from the model is received by any known method. The tests of the model suspended by means of the proposed suspension devices are effected as follows.

The required rigidity characteristics of all elastic elements 8, 27 of the device and the linear sizes of the ropes 7, 25, 28 and their points of fastening to the model 1 are determined. Then the model 1 is fastened to the lower ends of the vertical ropes 7, 28; the ropes 25 located in the horizontal plane are mounted and connected to the model 1. The design of the device is very simple and the mounting of the model 1 in the test section 2 of the wind tunnel 3 takes a very short time. After the model 1 has been mounted on the device, the natural oscillation of the model as a rigid body is recorded providing that the highest frequency of oscillation of the model 1, as a rigid body, on the suspension is several times lower than the frequency of natural elastic oscillation of the model.

After mounting the model in the test section of the wind tunnel and making control measurements of the oscillation frequency of the model, the planned investigations are started. These investigations can be effected by different technique and this does not result in any change in the parameters of the device.

In the presence of assymetry on the model, which appears in the flow V of the wind tunnel, it is countered by changing the length of the respective vertical ropes 7 and 28 by switching on the load-lifting mechanisms 30.

With correctly selected parameters of the device (rigidity of the elastic elements, linear size of the ropes, location of the points of fastening the system of ropes to the model) the stability of the model mounted on the proposed device increases with the flow velocity V.

It has been proved theoretically and verified experimentally that the use of the present device for studying aeroelasticity on models in low-velocity wind tunnels makes it possible to completely eliminate such an unpleasant testing phenomenon as instability of the suspended model (so called "suspension flutter") within the entire range of flow velocity V of any subsonic wind tunnel.

The use of the system of ropes 7, 28 arranged in vertical planes considerably increases the range of models which can be tested under conditions of simulating free flight in low-velocity wind tunnels. Connection of these ropes to respective load-lifting mechanisms 30 makes it possible to considerably simplify the mounting of the model in the test section of the wind tunnel and control the model without using the controls of the model itself. This reduces the cost of the experiment.

What is claimed is:

1. A device for suspension of an aircraft model in a wind tunnel, comprising two horizontal ropes extending on both sides of said model and connected to said model ahead and behind its center of gravity, as well as to said wind tunnel; two vertical ropes connected with their ends to said model, while their opposite ends are connected to said wind tunnel.

2. A device as claimed in claim 1, comprising elastic members connected to said vertical and horizontal ropes and said wind tunnel and intended to ensure six degrees of freedom for said model.

3. A device as claimed in claim 1, wherein said horizontal ropes are connected to said model ahead of its center of gravity with the aid of an equal-arm lever of the first kind, whereas said model is provided with a transverse slot to receive said lever of the first kind, which lever is hingedly coupled to said model.

4. A device as claimed in claim 1, including guides cantilevered to said model behind its center of gravity, said horizontal ropes being freely movable in said guides.

5. A device as claimed in claim 1, wherein said horizontal ropes are connected to said wind tunnel ahead and behind said aircraft model.

6. A device as claimed in claim 1, wherein said horizontal ropes are connected to said wind tunnel at one point ahead and one point behind said aircraft model.

7. A device as claimed in claim 1, including a pulley installed at the points where said horizontal ropes are fastened to said wind tunnel ahead of said model, said horizontal ropes being interconnected, their ends going around said pulley.

8. A device as claimed in claim 1, wherein said two vertical ropes are arranged in the plane of symmetry of said aircraft model.

9. A device as claimed in claim 1, comprising at least two additional ropes arranged in another vertical plane extending behind the center of gravity of said model, at a perpendicular to said vertical plane of symmetry of said model, the ends of said additional ropes being connected to said model at points spaced at equal distances from the plane of symmetry of said model, whereas the opposite ends of said additional ropes are connected to said wind tunnel.

10. A device for suspension of an aircraft model in a wind tunnel, comprising an equal-arm lever of the first kind, mounted on said aircraft model ahead of its center of gravity, for which purpose said model is provided with a transverse slot which receives said equal-arm lever of the first kind, hingedly coupled to said model; guides cantilevered to said model behind its center of gravity; a pulley installed in said wind tunnel ahead of said model; a horizontal rope making a loop fitted over said pulley, rigidly connected to said equal-arm lever of the first kind and freely movable in said guides; a vertical rope, one of its ends being connected to said model ahead of its center of gravity, whereas its opposite end is connected to said wind tunnel, said vertical rope being arranged in the plane of symmetry of said model; two vertical ropes connected to said model behind its center of gravity at equal distances from the plane of symmetry of said model, in the plane which is perpendicular to the plane of symmetry of said model; elastic members through which said vertical and horizontal ropes are attached to said wind tunnel, which elastic members ensure six degrees of freedom for said model and make it possible to simulate free flight conditions in said wind tunnel.

11. A device as claimed in claim 10, comprising hoisting mechanisms coupled to said elastic members of said vertical ropes, which hoisting mechanisms make it possible to adjust the positioning of said model in the throat of said wind tunnel both prior to and during experiments.

12. A device as claimed in claim 10, including a mechanism for tensioning said horizontal rope, which tensioning mechanism is arranged at the point where said horizontal rope is secured to said wind tunnel behind said aircraft model.

* * * * *